United States Patent
Goyal et al.

(10) Patent No.: US 12,296,855 B2
(45) Date of Patent: May 13, 2025

(54) UNMAPPED U-TURN BEHAVIOR PREDICTION USING MACHINE LEARNING

(71) Applicant: Waymo LLC, Mountain View, CA (US)

(72) Inventors: Vishu Goyal, Mountain View, CA (US); Shen Zhang, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 416 days.

(21) Appl. No.: 17/227,177

(22) Filed: Apr. 9, 2021

(65) Prior Publication Data
US 2022/0326714 A1 Oct. 13, 2022

(51) Int. Cl.
*B60W 60/00* (2020.01)
*G05D 1/00* (2006.01)
(Continued)

(52) U.S. Cl.
CPC ....... *B60W 60/0027* (2020.02); *G05D 1/0221* (2013.01); *G06N 5/04* (2013.01);
(Continued)

(58) Field of Classification Search
CPC ......... B60W 60/0027; B60W 2552/10; B60W 2554/4042; B60W 2554/4043;
(Continued)

(56) References Cited

U.S. PATENT DOCUMENTS

| 1,079,492 A | * | 11/1913 | Stum | B41K 3/123 |
| | | | | 101/352.08 |
| 9,784,592 B2 | * | 10/2017 | Gupta | B60W 30/00 |

(Continued)

FOREIGN PATENT DOCUMENTS

| EP | 2261603 | 4/2009 |
| WO | WO 2012/081963 | 6/2012 |

OTHER PUBLICATIONS

Chen et al., "Dangerous Driving Behavior Detection using Video-extracted Vehicle Trajectory Histograms" Journal of Intelligent Transportation Systems, Mar. 2017, 58 pages.
(Continued)

*Primary Examiner* — Joan T Goodbody
(74) *Attorney, Agent, or Firm* — Fish & Richardson P.C.

(57) ABSTRACT

Methods, systems, and apparatus, including computer programs encoded on a computer storage medium, for generating unmapped U-turn predictions using a machine learning model. One of the methods includes obtaining features of an agent travelling on a roadway. One or more unmapped U-turn regions in a vicinity of the agent on the roadway are identified. For each of the unmapped U-turn regions and from at least the features of the agent, a respective likelihood score that represents a likelihood that the agent intends to make an unmapped U-turn at the unmapped U-turn region is generated. Based on the respective likelihood scores, one or more of the unmapped U-turn regions are selected. For each selected unmapped U-turn region, data specifying a candidate future trajectory in which the agent makes the unmapped U-turn at the selected unmapped U-turn region is provided as a possible future trajectory for the agent.

20 Claims, 5 Drawing Sheets

(51) Int. Cl.
*G06N 5/04* (2023.01)
*G06N 20/00* (2019.01)

(52) U.S. Cl.
CPC ......... *G06N 20/00* (2019.01); *B60W 2552/10* (2020.02); *B60W 2554/4042* (2020.02); *B60W 2554/4043* (2020.02); *B60W 2554/4044* (2020.02); *B60W 2554/4045* (2020.02)

(58) Field of Classification Search
CPC .. B60W 2554/4044; B60W 2554/4045; G05D 1/0221; G06N 5/04; G06N 20/00; G06N 3/09; G06N 5/022
See application file for complete search history.

(56) References Cited

U.S. PATENT DOCUMENTS

| | | | |
|---|---|---|---|
| 2017/0004708 A1* | 1/2017 | Goldberg | G08G 1/0141 |
| 2019/0272446 A1* | 9/2019 | Kangaspunta | G01C 21/3859 |
| 2020/0160068 A1* | 5/2020 | Silver | G06F 18/217 |

OTHER PUBLICATIONS

Song et al., "Detection of Illegal U-turn Vehicles by Optical Flow Analysis" The Journal of Korean Institute of Communications and Information Sciences, Jul. 2014, 9 pages.
Tang et al., "Turn prediction at generalized intersections," 2015 IEEE Intelligent Vehicles Symposium, Jun. 2015, 6 pages.

* cited by examiner

UNMAPPED U-TURN BEHAVIOR PREDICTION USING MACHINE LEARNING

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes systems and techniques for predicting an unmapped U-turn behavior of an agent travelling on a roadway. The unmapped U-turn behavior can include the agent, e.g., a vehicle travelling on the roadway, taking a U-turn in a region of the roadway that is not marked as a U-turn lane, e.g., making an illegal or unpermitted U-turn.

In general, one innovative aspect of the subject matter described in this specification can be embodied in methods that include the actions of obtaining features of an agent travelling on a roadway; identifying one or more unmapped U-turn regions in a vicinity of the agent on the roadway, wherein each unmapped U-turn region is a region of the roadway at which U-turns are not mapped; generating, for each of the unmapped U-turn regions and from at least the features of the agent, a respective likelihood score that represents a likelihood that the agent intends to make an unmapped U-turn at the unmapped U-turn region; selecting, based on the respective likelihood scores, one or more of the unmapped U-turn regions; and for each selected unmapped U-turn region, providing data specifying a candidate future trajectory in which the agent makes the unmapped U-turn at the selected unmapped U-turn region as a possible future trajectory for the agent. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Each unmapped U-turn region includes a candidate lane segment in a road graph of a region of the roadway, wherein the candidate lane segment corresponds to one or more target lane segments in the road graph on an opposite side of the roadway relative to the candidate lane segment. The actions further include obtaining data specifying a road graph of a region of the roadway; identifying candidate lane segments in the region of the roadway; for each candidate lane segment, identifying one or more target lane segments on an opposite side of the roadway relative to the candidate lane segment; for each candidate lane segment and for each target lane segment: processing features of the candidate lane segment and the target lane segment using a first machine learning model that has been trained to process the features to generate a first score that represents a likelihood that agents will make a U-turn from the candidate lane segment into the target lane segment; and determining, for each candidate lane segment, whether to identify the candidate lane segment as the one or more unmapped U-turn regions based on the respective first score of the candidate lane segment. The actions further include generating a modified road graph of the region of the roadway, wherein the modified road graph includes the one or more unmapped U-turn regions determined based on one or more respective first scores, and wherein identifying the one or more unmapped U-turn regions in the vicinity of the agent on the roadway includes: accessing the modified road graph of the region to identify the one or more unmapped U-turn regions. The actions further include obtaining a plurality of training examples, each training example including: (1) features of an example candidate lane segment and features of an example target lane segment, and (2) a label indicating whether the example candidate lane segment is an unmapped U-turn region; and training the first machine learning model using the training examples. Generating, for each of the unmapped U-turn regions and from at least the features of the agent, the respective likelihood score includes: identifying, for each unmapped U-turn region, a candidate lane segment and one or more target lane segments on an opposite side of the roadway relative to the candidate lane segment; obtaining, the features of the agent; and for each candidate lane segment and for each target lane segment: processing features of the candidate lane segment and the target lane segment, and the features of the agent, using a second machine learning model that has been trained to process the features to generate the respective likelihood score that represents the likelihood that the agent intends to make the unmapped U-turn at the unmapped U-turn region from the candidate lane segment to the target lane segment. The actions further include for each selected unmapped U-turn region, providing features of the selected unmapped U-turn region as input to a motion planning subsystem; and generating, by the motion planning subsystem, the data specifying the candidate future trajectory in which the agent makes the unmapped U-turn at the selected unmapped U-turn region. The actions further include providing the data specifying the candidate future trajectory as input to a behavior prediction subsystem; and generating, by the behavior prediction subsystem, data specifying a prediction of a future behavior of the agent. The features of the agent include one or more of the following: historical trajectory, heading direction, status of one or more turn lights, and speed of the agent Particular embodiments of the subject matter described in this specification can be implemented so as to realize one or more of the following advantages.

An autonomous or semi-autonomous vehicle system can accurately predict unmapped U-turn behavior of an agent, which is important for the safety of the autonomous or semi-autonomous vehicle. The system can accurately predict when other agents are intending to make U-turns, even when those U-turns are unmapped, i.e., occurring at places that are not identified as valid U-turn regions on a map or a road graph of the environment. The system can provide the unmapped U-turn behavior prediction to a planning system, and the planning system can plan navigation of the autonomous or semi-autonomous vehicle based on the predicted unmapped U-turn behavior. For example, the autonomous vehicle can plan to yield or to maneuver around the agent such that a collision can be avoided. More generally, by being able to accurately predict illegal U-turn intents of the vehicles and the trajectories that those vehicles would likely follow given a predicted illegal U-turn intent, the autonomous vehicle can make better autonomous driving decisions or can provide better semi-autonomous driving recommendations for the operator of the vehicle.

The system can generate unmapped U-turn regions of the roadway where agents generally will make a U-turn and can save the generated unmapped U-turn regions in a modified road graph of the roadway. When analyzing the unmapped U-turn intent of a particular agent travelling in a particular region of the roadway, the system can access the modified road graph of the particular region to identify the previously generated unmapped U-turn regions as candidate regions. In this way, the system only needs to compute the unmapped U-turn regions for a region of the roadway once, without a need to compute the unmapped U-turn regions for different agents travelling at different times on the same region of the roadway.

The described techniques use one or more machine learning models to improve the accuracy of the unmapped U-turn predictions and can generate more accurate behavior predictions for the unmapped U-turn behaviors. The described techniques can provide a generalized solution applicable to unmapped U-turn behaviors at various locations of the road, e.g., at an intersection, or anywhere on the road. Instead of using hand-crafted rules based on heuristics, the described technique can train a U-turn behavior prediction machine learning model using historical log data that captures driving behaviors of many agents travelling in the roadway over an extended period of time. The described techniques can provide early predictions of unmapped U-turn behaviors of agents such that the planning system can have sufficient time to plan and respond to the predicted unmapped U-turn behaviors. The described techniques can be easily maintained and scaled by updating the one or more machine learning models.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a machine learning model to predict an unmapped U-turn behavior of an agent travelling on a road. The agent can be a car, a truck, a bus, a motorcyclist, a cyclist, a pedestrian, and so on.

A U-turn in driving refers to performing a U-shaped course, e.g., 180 degrees rotation, to reverse the direction of the travel. In some areas of the roadway, lanes are marked "U-turn permitted" or "U-turn only", i.e., according to road signage or road markings. An unmapped U-turn is a U-turn that is made from a region of a roadway that is not indicated as a valid source U-turn region in roadway information that is available to the system. For example, an unmapped U-turn can be a U-turn made from a turn lane where U-turns are not allowed according to road signage, a U-turn made from a lane that is not a turn lane according to markings on the road, a U-turn at a road segment that is painted double solid yellow or white lines or no-overtaking lines, a U-turn made from a lane on a one-way road.

As used in this description, a "fully-learned" machine learning model is a model that is trained to compute a desired prediction. In other words, a fully-learned model generates an output based solely on training data rather than on human-programmed decision logic.

Figure 1:
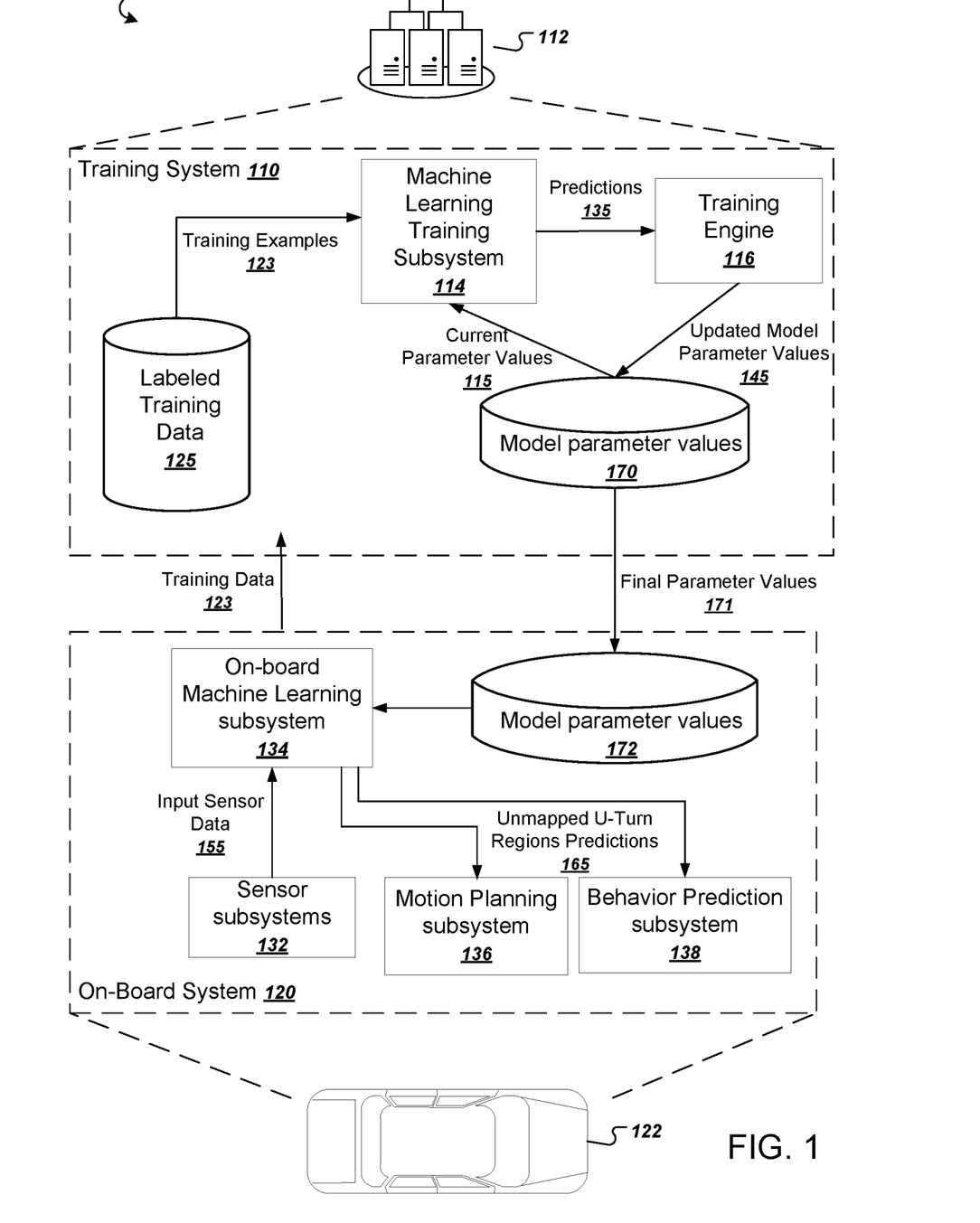
FIG. 1 is a diagram of an example system.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. The vehicle 122 in FIG. 1 is illustrated as an automobile, but the on-board system 120 can be located on-board any appropriate vehicle type.

The on-board system 120 can maintain a road graph of the environment. The road graph can include information of the road, including intersections, lanes, buildings, curbs, trees and bushes on the road, and so on. The road graph can include one or more properties of each lane, e.g., direction of the lane, whether an U-turn is allowed in a region of the lane, whether lane changing is allowed in a region of the lane, speed limit, and so on. The road graph can be stored locally in the on-board system 120 or can be downloaded and updated at intervals.

The on-board system 120 includes one or more sensor subsystems 132. The sensor subsystems include a combination of components that receive reflections of electromagnetic radiation, e.g., lidar systems that detect reflections of laser light, radar systems that detect reflections of radio waves, and camera systems that detect reflections of visible light.

The sensor subsystems 132 provide input sensor data 155 to an on-board neural network subsystem 134. The input sensor data 155 can include multiple channels of data, where each channel represents a different characteristic of reflected electromagnetic radiation. Thus, the input sensor data 155 derived from data generated by one or more sensors characterizes a scene in the vicinity of the autonomous vehicle. For example, the input sensor data 155 can be or can include an image of the scene captured from the camera systems. As another example, the input sensor data 155 can include depth information of the input image that characterizes a depth of the scene at different locations. As another example, the input sensor data 155 includes point cloud data characterizing the scene.

Generally, the input sensor data 155 could be one or multiple channels of data from one sensor, e.g., just an image, or multiple channels of data from multiple sensors, e.g., an image generated from the camera system and laser data generated from the laser readings.

The sensor-subsystems 132, or the on-board neural network subsystem 134, or some combination of both, transform raw sensor data into the multiple channels of input sensor data 155. To do so, the on-board system 120 can project the various characteristics of the raw sensor data into a common coordinate system.

The input sensor data 155 can depict features of the road and features of an agent travelling on the road. The features of the road can include live data captured by the sensor subsystems 132, e.g., an image capture by a camera indicating that a lane is temporarily closed due to construction, traffic light information, and so on. In some implementations, the road graph of an environment can be augmented using the features of the road captured by the input sensor data 155.

The features of an agent travelling on the road can include, for example, current and historical information of a vehicle that is travelling on a region of the road. For example, the features of a vehicle can include the speed of the vehicle over a period of time, the current and previous lane of the vehicle, lane change information, locations of the vehicle relative to an intersection or a lane, heading direction of the vehicle, and so on.

The features of the agent and the features of the road can be captured by one or more sensors in the sensor subsystems 132. For example, a camera can capture an image or a video of a scene that includes one or more cars travelling on the road, and the condition of the road. As another example, lidar sensors can capture point cloud data that depicts a scene of the road.

The on-board machine learning subsystem 134 implements the operations of a machine learning model trained to make unmapped U-turn predictions. Thus, the on-board machine learning subsystem 134 includes one or more computing devices having software or hardware modules that implement the respective operations of a machine learning model according to the configuration of the machine learning model.

A machine learning model can be trained to take as input: (i) features of an unmapped U-turn region and (ii) features of an agent of interest, and to generate a likelihood that the agent of interest intends to make an unmapped U-turn at the unmapped U-turn region. The on-board machine learning subsystem 134 can implement the operations of the machine learning model and generates one or more unmapped U-turn region predictions 165.

In some implementations, the on-board system 120 can store data identifying precomputed unmapped U-turn regions in the memory of the on-board system 120 and can access the precomputed unmapped U-turn regions when computing the unmapped U-turn behavior for a particular agent travelling on the road. This implementation can reduce the amount of computation that needs to be performed in the on-board system 120, and can reduce the total time required to generate unmapped U-turn behavior predictions.

In some implementations, a machine learning model can be trained to generate one or more unmapped U-turn regions that agents will make a U-turn at a region of the roadway, without considering the features of any particular agent. The trained machine learning model can be used to generate the data identifying the precomputed unmapped U-turn regions through computer system resources in the cloud outside the on-board system 120. The data identifying the precomputed unmapped U-turn regions can be used to update the road graph that the on-board system 120 downloads.

For example, the precomputed unmapped U-turn regions can be determined by running the first neural network trained to generate the unmapped U-turn regions based on features of the road graph, without taking into account features of a particular agent. The on-board system 120 can generate a modified road graph of the region of the roadway, and the modified road graph can include one or more precomputed unmapped U-turn regions. When the vehicle 122 is traveling on the road, the on-board system 120 can identify one or more unmapped U-turn regions in the vicinity of an agent on the roadway near the autonomous vehicle 122 by accessing the modified road graph of the region, instead of running the first neural network for the agent. For each identified unmapped U-turn region, based on the features of the agent, the on-board system can run the second neural network to generate a respective likelihood score that represents a likelihood that the agent intends to make an unmapped U-turn at each unmapped U-turn region. The on-board system 120 can select, based on the respective likelihood scores, one or more of the unmapped U-turn regions for the agent.

In some implementations, each unmapped U-turn region can include a candidate lane segment and one or more target lane segments. A candidate lane segment is a segment of the road graph where the agent would take a U-turn that is not mapped or marked. The candidate lane segment is usually on the same side of the road as the side of the road that the agent is currently travelling on. The candidate lane segment can be a segment of the road in the agent's heading direction, e.g. a segment of the road that the agent might arrive at in 10 seconds. For example, in the countries that vehicles drive on the right side of the road, a portion of the left most lane at an intersection that is 200 meters in front of a car can be a candidate lane segment. As another example, a portion of the left most lane next to double solid yellow lines can be a candidate lane segment where U-turns are not allowed.

Each candidate lane segment can correspond to one or more target lane segments in the road graph on the opposite side of the roadway relative to the candidate lane segment. When an agent takes the unmapped U-turn, the agent can travel from a candidate lane segment into a target lane segment on the opposite side of the road. For example, if the candidate lane segment is a portion of the left most lane at an intersection, a car can make the unmapped U-turn to a target lane segment that is a portion of the left most lane among the lanes on the opposite side of the road. As another example, if the candidate segment is a portion of the left most lane next to double solid yellow lines, a big truck can make the unmapped U-turn to a target lane segment that is a portion of the right most lane among the lanes on the opposite side the road because truck needs large enough space to maneuver the U-turn.

The on-board machine learning subsystem 134 can implement the operations of a machine learning model by loading a collection of model parameter values 172 that are received from the training system 110. Although illustrated as being logically separated, the model parameter values 170 and the software or hardware modules performing the operations may actually be located on the same computing device or, in the case of an executing software module, stored within the same memory device.

The on-board machine learning subsystem 134 can provide the one or more unmapped U-turn regions predictions 165 to a motion planning subsystem 136, a behavior prediction subsystem 138, or both.

When a motion planning subsystem 136 receives a selected unmapped U-turn region, e.g., a region where the agent is likely to make an unmapped U-turn, the motion planning subsystem 136 can generate a candidate future trajectory in which the agent makes the unmapped U-turn at the selected unmapped U-turn region. The candidate future trajectory includes a sequence of predicted future locations that the agent will follow when the agent makes the selected unmapped U-turn. In some implementations, the selected unmapped U-turn can include a candidate lane segment and a target lane segment. The motion planning subsystem 136 can generate a candidate future trajectory in which the agent makes the unmapped U-turn from the candidate lane segment to the target lane segment.

For example, for a cyclist agent at an intersection of the road, the candidate lane segment can be a portion of the left most lane and the target lane segment can be a portion of the right most lane on the opposite side of the road, e.g., the bicycle lane. The motion planning subsystem 136 can generate a candidate future trajectory in which the cyclist makes the unmapped U-turn from the left most lane to the right most lane on the opposite side of the road.

A behavior prediction subsystem 138 can receive as input a plurality of different candidate trajectories for many agents in the environment. Based on the candidate trajectories, the behavior prediction subsystem 138 can generate a score for each trajectory of these candidate trajectories, and the score can represent a likelihood that the corresponding agent will actually follow that candidate trajectory. The behavior prediction subsystem 138 can generate the score by modeling the interactions between the agents in the environment and by modeling the intentions of the agents.

In some implementations, the behavior prediction subsystem 138 can receive as input an unmapped U-turn candidate trajectory of a particular agent that is generated by the motion planning subsystem 136 based on the selected unmapped U-turn region. The unmapped U-turn candidate trajectory is a new possible intended trajectory for the particular agent. Based on the unmapped U-turn candidate trajectory and other possible trajectories of the particular agent, and based on candidate trajectories of other agents, the behavior prediction subsystem 138 can generate a score for the unmapped U-turn candidate trajectory for the particular agent. The score can represent a likelihood that the particular agent will actually follow the unmapped U-turn candidate trajectory.

In some implementations, when the on-board system 120 receives the unmapped U-turn predictions 165 of an agent travelling on the road, the on-board system 120 can use the unmapped U-turn predictions 165 to make fully-autonomous or semi-autonomous driving decisions. For example, the motion planning subsystem 136 can generate a fully-autonomous plan to predict a candidate future trajectory of a car that is making an unmapped U-turn, and the behavior prediction subsystem 138 can generate a likelihood score for the candidate future trajectory. If the likelihood score of the car following the candidate future trajectory to make the unmapped U-turn is higher than a predetermined threshold, the autonomous vehicle can plan to navigate around the car based on the predicted candidate future trajectory of the car. As another example, the system can generate the likelihood score of a candidate future trajectory for a truck on the left side of a four-way intersection making an unmapped U-turn to the right most lane on the opposite side of the road. The system can determine the likelihood score is lower than a predetermined threshold, i.e., the truck is not likely to make the unmapped U-turn, and based on that, the autonomous vehicle can determine to not yield to the truck.

The on-board system 120 can generate updates to the predictions of the unmapped U-turn behavior of one or more agents iteratively at a predetermined interval. For example, every 0.1 seconds, the on-board system 120 can generate an updated list of agents of interest in the vicinity of the autonomous vehicle and can generate an updated behavior prediction of whether each agent intends to make an unmapped U-turn, including generating a future trajectory of each predicted unmapped U-turn. Thus, the unmapped U-turn prediction can be iteratively updated and can reflect unmapped U-turn behaviors that are most up-to-date.

The on-board machine learning subsystem 134 can also use the input sensor data 155 to generate training data 123. The on-board system 120 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a machine learning training subsystem 114 that can implement the operations of a machine learning model, or each layer of a neural network that is designed to make unmapped U-turn predictions from input sensor data. The machine learning training subsystem 114 includes a plurality of computing devices having software or hardware modules that implement the respective operations of the machine learning model according to a configuration of the machine learning model.

The machine learning model in the training system 110 generally has the same architecture and parameters as the machine learning model in the on-board system 120. However, the training system 110 needs not use the same hardware to compute the operations of the machine learning model. In other words, the training system 110 can use CPUs only, highly parallelized hardware, or some combination of these.

The machine learning training subsystem 114 can compute the operations of the machine learning model using current parameter values 115 stored in a collection of model parameter values 170. Although illustrated as being logically separated, the model parameter values 170 and the software or hardware modules performing the operations may actually be located on the same computing device or on the same memory device.

The machine learning training subsystem 114 can receive training examples 123 as input. The training examples 123 can include labeled training data 125. For example, each of the training examples 123 can include features of an example candidate lane segment and a corresponding target lane segment, as well as a label that indicates whether the example candidate lane segment is an unmapped U-turn region. As another example, each of the training examples 123 can include features of an unmapped U-turn region and features of an agent, as well as a label that indicates whether the agent would make an unmapped U-turn at the unmapped U-turn region.

The machine learning training subsystem 114 can generate, for each training example 123, one or more predictions 135. For example, each prediction 135 represents whether an agent is likely to make an unmapped U-turn at the input unmapped U-turn region. A training engine 116 analyzes the predictions 135 and compares the predictions to the labels in the training examples 123. The training engine 116 then generates updated model parameter values 145. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. The training system 110 can provide the final set of model parameter values 171 by a wired or wireless connection to the on-board system 120.

Figure 2:
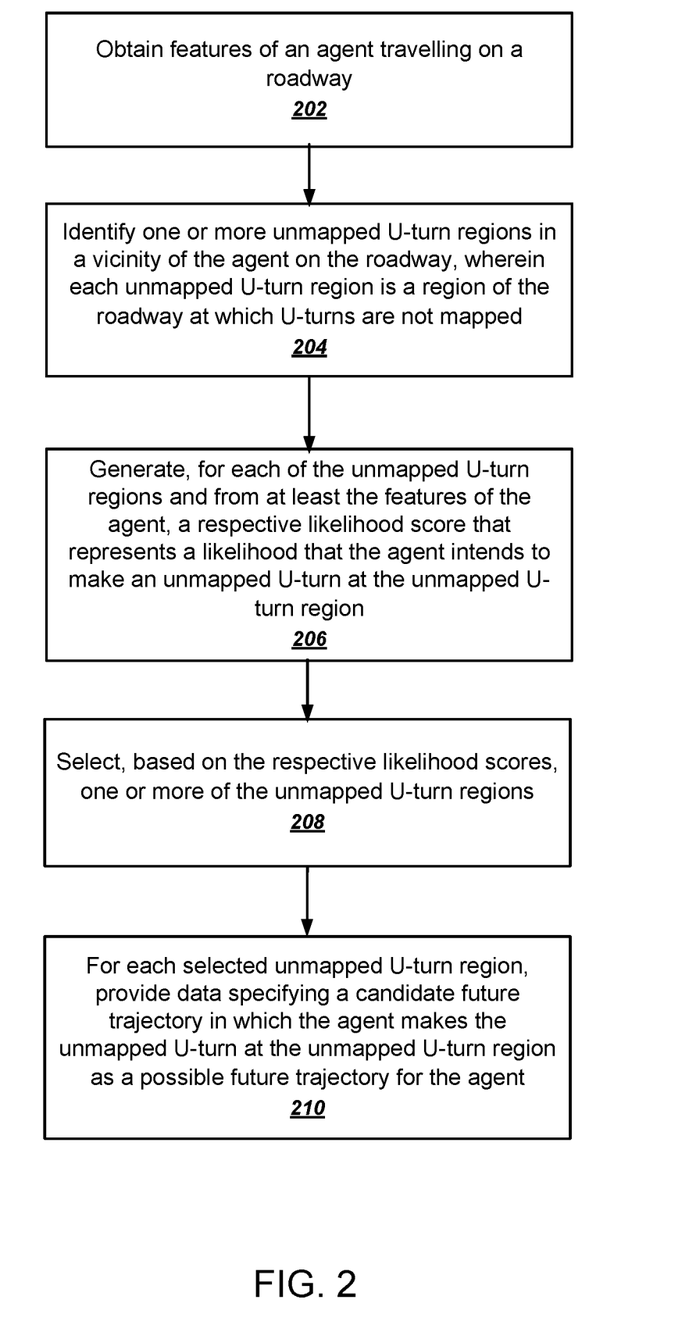
FIG. 2 is a flow chart of an example process for generating an unmapped U-turn trajectory.

FIG. 2 is a flow chart of an example process for generating an unmapped U-turn trajectory. The process will be described as being performed by an appropriately programmed on-board system 120.

The system obtains features of an agent travelling on a roadway (202). The agent can be a moving object traveling on the road that is in the vicinity of the autonomous or semi-autonomous vehicle 122. The agent can be a car, a truck, a bus, a motorcycle, a cyclist, or a pedestrian, and so on. For example, the agent can be a car that is 250 meters away from the vehicle 122 travelling on the opposite side of the road relative to the vehicle 122. The system can be configured to make fully-autonomous or semi-autonomous driving decisions based on the behavior predictions of the agent, e.g., based on whether the agent intends to make an illegal U-turn.

The features of the agent can include one or more of the following: the speed of the agent over a period of time, the current lane and previous lane of the agent, the trajectory of the agent over a period of time, the locations of the agent over a period of time (e.g., relative to an intersection or a lane), the heading direction of the agent, the status of the turns signals of the agent, and so on. The system can obtain features of the agent from the input sensor data 155 collected by the sensor subsystems 132.

For example, a camera of the system can capture a video of a car travelling on the road, and the video can indicate that the left turn light of the car is flashing as the car approaches an intersection where a U-turn is not allowed. The video can indicate the historical trajectory of the car, e.g., that car changed its lane from the middle lane to the left most lane. The video can indicate that the speed of the car has slowed down as the car approaches the intersection.

The system identifies one or more unmapped U-turn regions in a vicinity of the agent on the roadway (204). Each unmapped U-turn region is a region of the roadway at which U-turns are not mapped or not permitted, i.e., according to road signage or road markings, but which has been determined to be a region where agents are likely to make U-turns. An unmapped U-turn region can be, for example, a region where the U-turn is not marked in a road graph. For example, an unmapped U-turn region can be a portion of the left most lane at a four-way intersection where the road graph does not connect the left most lane to the lanes on the opposite side of the road, i.e., the U-turn is not marked on the road graph.

In some implementations, the unmapped U-turn region can include a candidate lane segment in a road graph of a region of the roadway. The candidate lane segment can correspond to one or more target lane segments in the road graph on an opposite side of the roadway relative to the candidate lane segment. An agent could make a U-turn from the candidate lane segment to the target lane segment, but the road graph does not connect the candidate lane segment to the target lane segment. For example, the candidate lane segment can be a portion of the left most lane at an intersection. The corresponding target lane segments can include one or more of the lanes on the opposite site of the road. Agents on the road can make the unmapped U-turn from the candidate lane segment into one of the target lane segments.

In some implementations, the system can determine the unmapped U-turn regions based on features of the candidate lane segment and features of the target lane segment using a trained machine learning model.

In some implementations, the system can identify the unmapped U-turn regions by accessing previously determined unmapped U-turn regions that are within a predetermined distance from the current location of the agent. For example, the system can obtain previously determined unmapped U-turn regions that are within 200 meters from the current location of the agent in the agent's heading direction. In some implementations, the system can generate a modified road graph of the roadway that includes the previously determined unmapped U-turn regions. The system can identify the unmapped U-turn regions in the vicinity of the agent on the roadway by accessing the modified road graph. More details on determining the unmapped U-turn regions using a machine learning model is described in connection with FIG. 3 and FIG. 4.

The system generates, for each of the unmapped U-turn regions and from at least the features of the agent, a respective likelihood score that represents a likelihood that the agent intends to make an unmapped U-turn at the unmapped U-turn region (206). In some implementations, the system can use a trained machine learning model to generate the likelihood score. The likelihood score can be a probability value that is between 0 and 1. For example, the system can generate a likelihood score of 0.4 for the first unmapped U-turn region, a likelihood score of 0.8 for the second unmapped U-turn region, and a likelihood score of 0.9 for the third unmapped U-turn region. More details on generating the respective likelihood scores for the unmapped U-turn regions using a trained machine learning model is described in connection with FIG. 3 and FIG. 5.

The system determines whether to select any of the unmapped U-turn regions based on the respective likelihood scores (208). The system can select unmapped U-turn regions by comparing the respective likelihood scores with a predetermined threshold value. The system can select the unmapped U-turn region that corresponds to the highest likelihood score that is larger than the predetermined threshold value or can select any unmapped U-turn region that has a likelihood score that is larger than the threshold value.

For example, the system can generate a likelihood score of 0.4 for the first unmapped U-turn region, a likelihood score of 0.8 for the second unmapped U-turn region, and a likelihood score of 0.9 for the third unmapped U-turn region. The predetermined threshold value can be 0.5. The system can determine that the second and the third unmapped U-turn regions both have likelihood scores that are larger than the predetermined threshold value. The system can select the third unmapped U-turn region because it corresponds to the highest likelihood score.

For each selected unmapped U-turn region, the system provides data specifying a candidate future trajectory in which the agent makes the unmapped U-turn at the selected unmapped U-turn region as a possible future trajectory for the agent (210). The candidate future trajectory can include a sequence of locations in which the agent makes the unmapped U-turn. The system can generate the candidate future trajectory from a path that starts from a candidate lane segment to a target lane segment on the opposite side of the roadway using any of a variety of conventional motion planning techniques. Examples of motion planning techniques include pure pursuit algorithms for path tracking, recurrent neural network models trained using supervised learning, non-linear optimization techniques, iLQR (iterative linear quadratic regulator) trajectory optimization, and so on.

The candidate future trajectory can include a likelihood score for the trajectory, and the likelihood score can indicate the likelihood that the agent follows the candidate future trajectory when making the unmapped U-turn at the selected unmapped U-turn region. In some implementations, the system can generate several candidate future trajectories and a respective likelihood score for each of the candidate future trajectories.

In some implementations, each selected unmapped U-turn region can include a candidate lane segment and a target lane segment. The system can generate a candidate future trajectory in which the agent makes the unmapped U-turn from the candidate lane segment to the target lane segment. The candidate future trajectory can include a sequence of locations of the agent from a starting location at the candidate lane segment to an ending location at the target lane segment.

For example, the system can select an unmapped U-turn region for a big truck that is travelling on the roadway. The unmapped U-turn region can include a candidate lane segment located at a portion of the left most lane of the intersection, and can include a target lane segment located at a portion of the right most lane on the opposite side of the road. The system can provide data specifying a candidate trajectory in which the truck makes the unmapped U-turn at the selected unmapped U-turn region from the left most lane to the right most lane on the opposite side of the road. The system can determine a sequence of locations at 0.03 second intervals for the truck travelling from the left most lane to the right most lane. The system can generate a likelihood score for the candidate future trajectory, e.g., a likelihood score of 0.8. The system can provide this candidate future trajectory as a possible future trajectory for the truck. When there exists multiple candidate trajectories, the system can select a candidate future trajectory with the highest likelihood score from the multiple candidate trajectories. The system can use the selected candidate future trajectory for the truck to make autonomous and semi-autonomous decisions for the vehicle 122.

Figure 3:
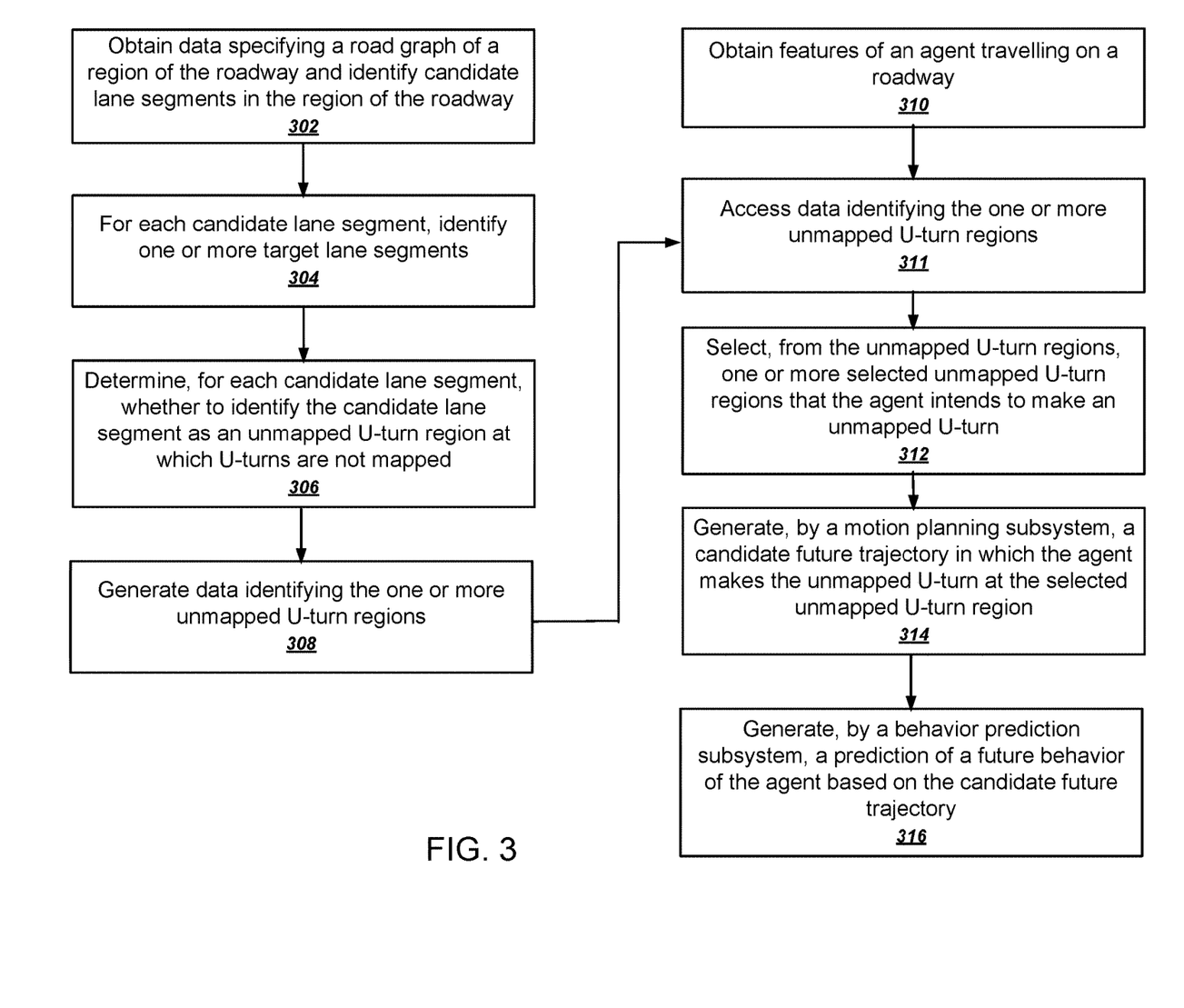
FIG. 3 is a flow chart of an example process for generating an unmapped U-turn behavior prediction.

FIG. 3 is a flow chart of an example process for generating an unmapped U-turn behavior prediction. The process for the steps 302, 304, 306, and 308 can be performed by an appropriately programmed remote system that is away from the on-board system 120. The process for the steps 310, 312, 314, and 316 will be described as being performed by an appropriately programmed on-board system 120.

In steps 302, 304, 306, and 308, the system generates and stores one or more unmapped U-turn regions where agents will make U-turns. These steps are usually performed by a remote system, using computing resources away from the autonomous or semi-autonomous vehicle 122, e.g., using one or more computer systems in the cloud. These unmapped U-turn regions can be generated based on features of the region of the road, without considering the features of a particular agent.

In steps 310, 312, 314, and 316, the on-board system accesses the previously generated unmapped U-turn regions, and selects, from the precomputed U-turn regions, one or more U-turn regions in which a particular agent intends to make an unmapped U-turn. The on-board system 120, performs these steps repeatedly as the vehicle 122 navigates through an environment. As the vehicle navigates through different regions of the roadway, the on-board system 120 iteratively can update the predicted unmapped U-turn regions where agents in the vicinity of the vehicle intend to make an unmapped U-turn.

The remote system obtains data specifying a road graph of a region of the roadway and identifies candidate lane segments in the region of the roadway (302). For example, the system can obtain data specifying lanes at a four-way intersection. Among the four lanes that are heading west, the left two lanes are lanes where left turns are allowed. According to the road signage at the intersection, a U-turn is not allowed from any of the four lanes and a U-turn is therefore not mapped in any of the four lanes. The system can identify a portion of the left most lane as a candidate lane segment. For example, the system can identify a portion of the left most lane that is closest to the intersection with a predetermined length, e.g., 3 meters from the intersection, as the candidate lane segment.

For each candidate lane segment, the remote system identifies one or more target lane segments (304). For example, the road graph can depict three lanes on the opposite side of the road relative to the candidate lane segment. The system can identify the respective portions of the three lanes as three target lane segments. Each target lane segment can include a portion of the respective lane that is closest to the intersection and each portion can have a predetermined length. An agent could travel from the candidate lane segment, i.e., the left most lane, to any one of the target lane segments on the opposite side of the road.

For each candidate lane segment, the remote system determines whether to identify the candidate lane segment as an unmapped U-turn region at which U-turns are not mapped but are still relatively likely to be performed (306). The system identifies the one or more target lane segments for the candidate lane segment. For each pair of candidate lane segment and target lane segment, the system can process features of the candidate lane segment and features of the target lane segment using a first machine learning model. The features of the candidate lane segment or the features of the target lane segment can include width, length, slope, road margins, traffic separators, curbs, road signage, and so on.

The machine learning model has been trained to process the features of the candidate lane segment and the features of the target lane segment to generate a first score that represents a likelihood that agents will make a U-turn from the candidate lane segment to the target lane segment. The remote system can determine, for each candidate lane segment, whether to identify the candidate lane segment as an unmapped U-turn region based on the first scores. For example, the system can compute three scores indicating the respective likelihood that agents would make unmapped U-turns from three candidate lane segments to their respective target lane segments. The scores can be, for example, 0.9, 0.7, and 0.3. As another example, the system can compute three scores indicating the respective likelihood that agents would make unmapped U-turns from the same candidate lane segment to three different target lane segments.

For each candidate lane segment, the remote system can determine whether to identify the candidate lane segment as an unmapped U-turn region based on the one or more scores. The system can compare the one or more scores with a threshold. If any of the scores exceeds the threshold, the system can determine that the candidate lane segment is an unmapped U-turn region. The system can further associate one or more target lane segments with the unmapped U-turn region. In some implementations, the system can associate the unmapped U-turn region with the target lane segment that has the highest score. In some implementations, the system can associate the unmapped U-turn region with all target lane segments that have a respective score exceeding the threshold.

The remote system generates data identifying the one or more unmapped U-turn regions (308). In some implementations, the system generates a modified road graph that includes the data identifying the one or more unmapped U-turn regions. For example, the system can add an unmapped U-turn region label to the properties of a lane segment, and the system can set the label to be TRUE. As another example, the system can add data specifying an unmapped U-turn region in the cache that stores the road graph.

The remote system can send the data identifying the unmapped U-turn regions to an autonomous or semi-autonomous vehicle 122 that is travelling on the roadway. For example, the system can determine that the vehicle 122 is travelling in a region in the vicinity of the one or more identified unmapped U-turn regions (e.g., within 300 meters range), and in response, the system can send the data identifying the unmapped U-turn regions to the vehicle.

The on-board system 120 obtains features of an agent travelling on a roadway (310). For example, when the vehicle 122 is travelling on the road, the system can identify a car that is traveling in the incoming direction and the car might arrive at an intersection in 10 seconds. The system can perform behavior prediction on the car, in particular, whether the car intends to make an illegal U-turn, which could affect the navigation decisions of the vehicle 122.

The on-board system accesses the data identifying the one or more unmapped U-turn regions that were previously computed by the remote system (311). The on-board system selects, from the unmapped U-turn regions, one or more selected unmapped U-turn regions that the agent intends to make an unmapped U-turn (312). The system can access the modified road graph of the region in which the agent is travelling on and obtain the one or more previously determined unmapped U-turn regions stored in the modified road graph. By accessing previously determined unmapped U-turn regions, the system can save computational cost and reduce response time.

In some implementations, the on-board system can determine the unmapped U-turn regions on the fly while the vehicle 122 is travelling on the road. For example, if the vehicle is travelling on a section of the road where previously determined unmapped U-turn regions are not available, the system of the vehicle 122 can determine one or more unmapped U-turn regions while the vehicle 122 is travelling on the road.

The on-board system can process the features of the one or more precomputed unmapped U-turn regions and features of the agent using a second machine learning model. The second machine learning model has been trained to process these features to generate, for each precomputed unmapped U-turn region, a respective likelihood score that represents the likelihood that the agent intends to make an unmapped U-turn at each unmapped U-turn region. The system can select, based on the respective likelihood scores, one or more of the unmapped U-turn regions for the agent.

The on-board system generates, by a motion planning subsystem, a candidate future trajectory in which the agent makes the unmapped U-turn at the selected unmapped U-turn region (314). For each selected unmapped U-turn region, the system can provide features of the selected unmapped U-turn region as input to a motion planning subsystem 136. The motion planning subsystem 136 can generate data specifying the candidate future trajectory in which the agent makes the unmapped U-turn at the selected unmapped U-turn region.

The on-board system generates, by a behavior prediction subsystem, a prediction of a future behavior of the agent based on the candidate future trajectory (316). The system can provide the data specifying the candidate future trajectory as input to the behavior prediction subsystem 138. The candidate future trajectory of the agent making an unmapped U-turn is a new possible intended trajectory for the agent. The behavior prediction subsystem can also receive other intended trajectories for the agent, for example, making a left turn, going straight, and so on. Based on the unmapped U-turn candidate trajectory and other possible trajectories of the agent, and based on candidate trajectories of other agents on the roadway, the behavior prediction subsystem can generate data specifying a prediction of a future behavior of the agent. For example, the behavior prediction subsystem can generate a score for the unmapped U-turn candidate trajectory. The score can represent a likelihood that the agent will actually follow the unmapped U-turn candidate trajectory. If the score is larger than a threshold, the behavior prediction subsystem can determine that the agent intends to make an unmapped U-turn.

Figure 4:
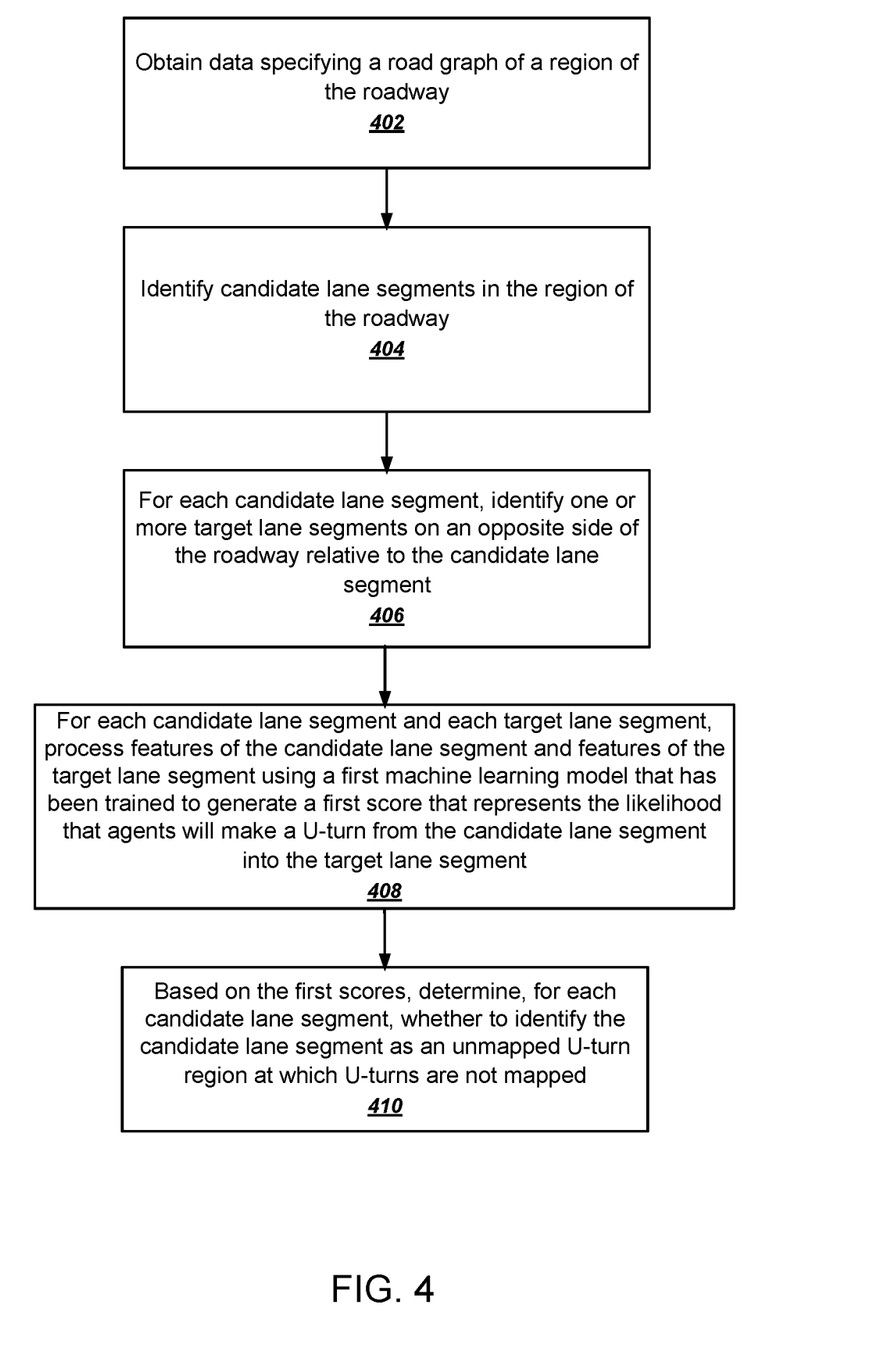
FIG. 4 is a flow chart of an example process for generating unmapped U-turn regions for a region of a roadway.

FIG. 4 is a flow chart of an example process for generating unmapped U-turn regions for a region of a roadway. The example process in FIG. 4 uses a forward inference pass through a machine learning model (e.g., a neural network) that has already been trained or is being trained to make predictions of unmapped U-turn regions. The example process can thus be used during training or to make predictions from unlabeled input, e.g., in a production system. The process will be described as being performed by an appropriately programmed neural network system.

The system obtains data specifying a road graph of a region of the roadway (402). The system identifies candidate lane segments in the region of the roadway (404). For each candidate lane segment, the system identifies one or more target lane segments on the opposite side of the roadway relative to the candidate lane segment (406).

For each candidate lane segment and each target lane segment, the system processes an input that includes the features of the candidate lane segment and the features of the target lane segment using a first machine learning model that has been trained to generate a first score that represents the likelihood that agents will make a U-turn from the candidate lane segment into the target lane segment (408).

The first machine learning model can be any machine learning model that can be trained to generate a likelihood score that represents the likelihood that agents will make a U-turn from the candidate lane segment into the target lane segment. For example, the first machine learning model can be a gradient boosting decision tree model, an AdaBoost decision tree model, a random forest, or other decision-tree based machine learning model, or a neural network model such as a convolutional neural network (CNN), generative adversarial neural network (GAN), and so on.

The training system 110 can train the first machine learning model with training examples 123. The system can obtain a plurality of training examples. Each training example can include: (1) features of an example candidate lane segment and features of an example target lane segment, and (2) a label indicating whether the example candidate lane segment is an unmapped U-turn region that agents will make a U-turn.

To generate the training examples, the system can obtain historical log data that captures driving behaviors of many agents travelling in the region of the roadway, e.g., over an extended period of time. The system can analyze the log data and identify agents that made the unmapped U-turns at the candidate lane segments. The system can identify the unmapped U-turns from a candidate lane segment to a target lane segment. The system can generate, for each candidate lane segment, a frequency of these unmapped U-turn trajectories. The frequency of an unmapped U-turn from a candidate lane segment to a target lane segment can be, for example, a ratio of the total number of U-turns from the candidate lane segment to the target lane segment over the total number of times when agents navigated through the candidate lane segment. For example, over the past two years, if twenty out of fifty agents navigated through the candidate lane segment actually made U-turn to the target lane segment, the frequency of the unmapped U-turn trajectory can be 20/50=0.4. The system can generate a label indicating whether the candidate lane segment is an unmapped U-turn region by comparing the frequency with a predetermined threshold. The label can be a binary TRUE or FALSE label. For example, if the frequency of an unmapped U-turn trajectory from a candidate lane segment is 0.4, which is larger than the predetermined threshold of 0.3, the system can determine that the label for the candidate lane segment is TRUE, i.e., the candidate lane segment is an unmapped U-turn region.

The system can train the first machine learning model using the training examples. When the first machine learning model is a decision tree based machine learning model, the system can generate a decision tree model by iteratively building a set of hierarchical decision boundaries based on the training examples. For example, at each iteration, the system can determine a selected best feature in the training examples to split the training examples. The system can define a node on the tree as a splitting point based on the selected best feature and can split the training examples into subsets. The system continues the splitting until classification accuracy is optimized while minimizing the number of splits or nodes. The system can apply a pruning process to the generated decision tree to prevent overfitting by removing the unnecessary structure from the generated decision tree.

In some implementations, when the first machine learning model is a neural network model, the system can train the first machine learning model using the training examples by comparing the unmapped U-turn predictions to the labels in the training examples. The system can calculate a loss which can measure the differences between the unmapped U-turn predictions and the labels in the training examples. The loss can be calculated using a classification loss function, e.g., binary cross-entropy loss, hinge loss, squared hinge loss, sigmoid focal loss, and so on. The system can generate updated model parameter values of the first machine learning model based on a loss by using an appropriate updating technique, e.g., stochastic gradient descent with backpropagation. The system can then update the collection of model parameter values using the updated model parameter values.

Based on the first scores, the system determines, for each candidate lane segment, whether to identify the candidate lane segment as an unmapped U-turn region at which U-turns are not mapped (410). In some implementations, the system can select the candidate lane segment that has the highest first score that is also larger than a predetermined threshold as an unmapped U-turn region. If the highest first score is not larger than the predetermined threshold, none of the candidate lane segments are selected as unmapped U-turns regions because it is unlikely that agents will make unmapped U-turns at any of these candidate lane segments.

In some implementations, the system can select more than one candidate lane segments as the unmapped U-turn regions, if each of their respective first scores is larger than the predetermined threshold. The system can generate a modified road graph of the region of the roadway, wherein the modified road graph includes data indicating the one or more unmapped U-turn regions determined based on the first scores.

Figure 5:
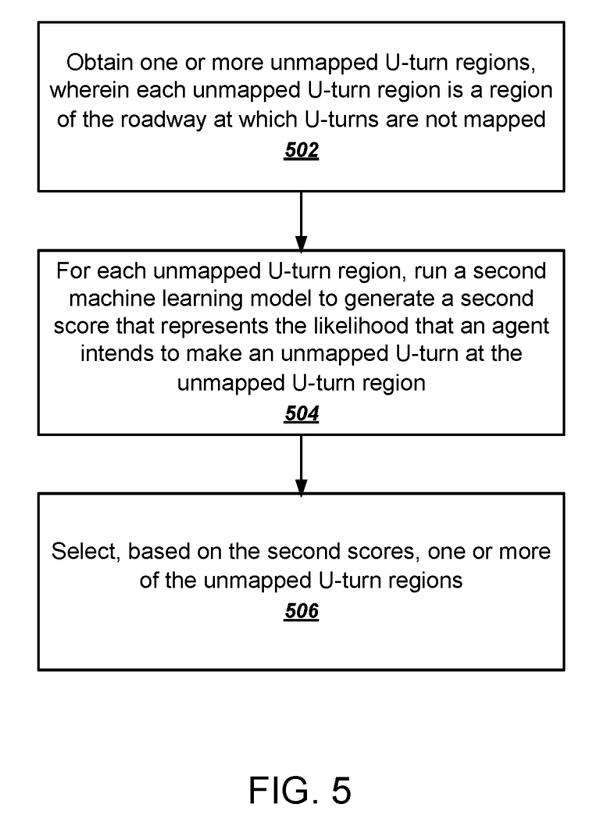
FIG. 5 is a flow chart of an example process for generating unmapped U-turn regions for an agent travelling on a region of a roadway.

FIG. 5 is a flow chart of an example process for generating unmapped U-turn regions for an agent travelling on a region of a roadway. The example process in FIG. 5 uses a forward inference pass through a machine learning model (e.g., a neural network) that has already been trained or is being trained to make predictions of unmapped U-turn regions for an agent. The example process can thus be used during training or to make predictions from unlabeled input, e.g., in a production system. The process will be described as being performed by an appropriately programmed neural network system.

The system obtains one or more unmapped U-turn regions (502). Each unmapped U-turn region is a region of the roadway at which U-turns are not mapped. In some implementations, for each unmapped U-turn region, the system identifies a candidate lane segment and one or more target lane segments on an opposite side of the roadway relative to the candidate lane segment. In some implementations, the system accesses a modified road graph of the region to identify previously determined unmapped U-turn regions.

For each unmapped U-turn region, the system processes an input that includes features of the unmapped U-turn region and features of a particular agent using a second machine learning model that has been trained to generate a second score that represents a likelihood that the particular agent intends to make an unmapped U-turn at the unmapped U-turn region (504). In some implementations, the features of the unmapped U-turn region can include features of the candidate lane segment and features of the target lane segment.

The second machine learning model has been trained to process the features of the unmapped U-turn region and the features of the agent, to generate a likelihood score that represents the likelihood that the agent intends to make an unmapped U-turn at the unmapped U-turn region. In some implementations, the likelihood score represents the likelihood that the agent intends to make an unmapped U-turn from the candidate lane segment to the target lane segment.

The second machine learning model can be any machine learning model that can be trained to generate a likelihood score that represents the likelihood that the agent intends to make an unmapped U-turn at the unmapped U-turn region. For example, the second machine learning model can be a gradient boosting decision tree model, an AdaBoost decision tree model, a random forest, or other decision-tree based machine learning model, or a neural network model such as a CNN, GAN, and so on.

The training system 110 can train the second machine learning model with training examples 123. The system can obtain a plurality of training examples. Each training example can include: (1) features of an unmapped U-turn region, (2) features of an agent, and (2) a label indicating whether the agent makes an unmapped U-turn at the unmapped U-turn region.

To generate the training examples, the system can obtain historical log data that captures driving behaviors of many agents travelling in the region of the roadway, e.g., over an extended period of time. The system can analyze the log data and identify agents that made or did not make the unmapped U-turns at the unmapped U-turn regions. The system can generate, for each unmapped U-turn region and for each agent, a label indicating whether the agent made the unmapped U-turn at the unmapped U-turn region. The label can be a binary TRUE or FALSE label.

The system can train the second machine learning model using the training examples. The system can train the second machine learning model with the training techniques described in connection with FIG. 4.

The system selects, based on the second scores, one or more of the unmapped U-turn regions (506). In some implementations, the system can select the unmapped U-turn region that has the highest second score that is also larger than a predetermined threshold. If the highest second score is not larger than the predetermined threshold, none of the unmapped U-turn regions are selected as unmapped U-turns lanes because it is unlikely that the agent intends to make an unmapped U-turn at any of these regions. In some implementations, the system can select more than one unmapped U-turn regions for the agent, if each of their respective second scores is larger than the predetermined threshold.

Based on the one or more selected unmapped U-turn regions for the agent, the system can plan autonomous or semi-autonomous decisions for the vehicle 122. The system can provide data specifying a candidate future trajectory in which the agent makes the unmapped U-turn at the selected unmapped U-turn region as a possible future trajectory for the agent. Based on the possible future trajectory for the agent, the system can make navigation decisions for the vehicle 122, for example, to avoid collision with the agent.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   obtaining features of an agent travelling on a roadway;
   identifying one or more unmapped U-turn regions in a vicinity of the agent on the roadway based on a respective first score for each unmapped U-turn region, wherein:
      each unmapped U-turn region comprises a candidate lane segment in a road graph of the region of the roadway,
      the candidate lane segment corresponds to one or more target lane segments in the road graph on an opposite side of the roadway relative to the candidate lane segment, and
      the respective first score for each unmapped U-turn region represents a likelihood that agents will make a U-turn from the candidate lane segment into one of the one or more target lane segments that corresponds to the candidate lane segment;
   generating, for each of the unmapped U-turn regions and from at least the features of the agent, a respective likelihood score that represents a likelihood that the agent intends to make an unmapped U-turn at the unmapped U-turn region;
   selecting, based on the respective likelihood scores, one or more of the unmapped U-turn regions;
   for each selected unmapped U-turn region, providing data specifying a candidate future trajectory in which the agent makes the unmapped U-turn at the selected unmapped U-turn region as a possible future trajectory for the agent; and
   controlling an autonomous vehicle based on the data specifying the candidate future trajectory of the agent.

2. The method of claim 1, further comprising:
obtaining data specifying a road graph of a region of the roadway;
identifying candidate lane segments in the region of the roadway;
for each candidate lane segment, identifying the one or more target lane segments on the opposite side of the roadway relative to the candidate lane segment; and
for each candidate lane segment and for each target lane segment:
processing features of the candidate lane segment and features of the target lane segment using a first machine learning model that has been trained to process the features to generate the first score.

3. The method of claim 2, further comprising generating a modified road graph of the region of the roadway, wherein the modified road graph comprises the one or more unmapped U-turn regions determined based on one or more respective first scores; and
wherein identifying the one or more unmapped U-turn regions in the vicinity of the agent on the roadway comprises: accessing the modified road graph of the region to identify the one or more unmapped U-turn regions.

4. The method of claim 2, further comprising:
obtaining a plurality of training examples, each training example comprising: (1) features of an example candidate lane segment and features of an example target lane segment, and (2) a label indicating whether the example candidate lane segment is an unmapped U-turn region; and
training the first machine learning model using the training examples.

5. The method of claim 1, wherein generating, for each of the unmapped U-turn regions and from at least the features of the agent, the respective likelihood score comprises:
identifying, for each unmapped U-turn region, a candidate lane segment and one or more target lane segments on an opposite side of the roadway relative to the candidate lane segment;
obtaining, the features of the agent; and
for each candidate lane segment and for each target lane segment:
processing features of the candidate lane segment, features of the target lane segment, and the features of the agent, using a second machine learning model that has been trained to process the features to generate the respective likelihood score that represents the likelihood that the agent intends to make the unmapped U-turn at the unmapped U-turn region from the candidate lane segment to the target lane segment.

6. The method of claim 1, further comprising:
for each selected unmapped U-turn region,
providing features of the selected unmapped U-turn region as input to a motion planning subsystem; and
generating, by the motion planning subsystem, the data specifying the candidate future trajectory in which the agent makes the unmapped U-turn at the selected unmapped U-turn region.

7. The method of claim 1, further comprising:
providing the data specifying the candidate future trajectory as input to a behavior prediction subsystem; and
generating, by the behavior prediction subsystem, data specifying a prediction of a future behavior of the agent.

8. The method of claim 1, wherein the features of the agent comprise one or more of the following: historical trajectory, heading direction, status of one or more turn lights, and speed of the agent.

9. A system comprising one or more computers and one or more storage devices storing instructions that when executed by the one or more computers cause the one or more computers to perform operations comprising:
obtaining features of an agent travelling on a roadway;
identifying one or more unmapped U-turn regions in a vicinity of the agent on the roadway based on a respective first score for each unmapped U-turn region, wherein:
each unmapped U-turn region comprises a candidate lane segment in a road graph of the region of the roadway,
the candidate lane segment corresponds to one or more target lane segments in the road graph on an opposite side of the roadway relative to the candidate lane segment, and
the respective first score for each unmapped U-turn region represents a likelihood that agents will make a U-turn from the candidate lane segment into one of the one or more target lane segments that corresponds to the candidate lane segment;
generating, for each of the unmapped U-turn regions and from at least the features of the agent, a respective likelihood score that represents a likelihood that the agent intends to make an unmapped U-turn at the unmapped U-turn region;
selecting, based on the respective likelihood scores, one or more of the unmapped U-turn regions;
for each selected unmapped U-turn region, providing data specifying a candidate future trajectory in which the agent makes the unmapped U-turn at the selected unmapped U-turn region as a possible future trajectory for the agent; and
controlling an autonomous vehicle based on the data specifying the candidate future trajectory of the agent.

10. The system of claim 9, the operations further comprise:
obtaining data specifying a road graph of a region of the roadway;
identifying candidate lane segments in the region of the roadway;
for each candidate lane segment, identifying the one or more target lane segments on the opposite side of the roadway relative to the candidate lane segment; and
for each candidate lane segment and for each target lane segment:
processing features of the candidate lane segment and features of the target lane segment using a first machine learning model that has been trained to process the features to generate the first score.

11. The system of claim 10, wherein the operations further comprise generating a modified road graph of the region of the roadway, wherein the modified road graph comprises the one or more unmapped U-turn regions determined based on one or more respective first scores; and
wherein identifying the one or more unmapped U-turn regions in the vicinity of the agent on the roadway comprises: accessing the modified road graph of the region to identify the one or more unmapped U-turn regions.

12. The system of claim 10, the operations further comprise:
obtaining a plurality of training examples, each training example comprising: (1) features of an example candidate lane segment and features of an example target lane segment, and (2) a label indicating whether the example candidate lane segment is an unmapped U-turn region; and
training the first machine learning model using the training examples.

13. The system of claim 9, wherein generating, for each of the unmapped U-turn regions and from at least the features of the agent, the respective likelihood score comprises:
identifying, for each unmapped U-turn region, a candidate lane segment and one or more target lane segments on an opposite side of the roadway relative to the candidate lane segment;
obtaining, the features of the agent; and
for each candidate lane segment and for each target lane segment:
processing features of the candidate lane segment, features of the target lane segment, and the features of the agent, using a second machine learning model that has been trained to process the features to generate the respective likelihood score that represents the likelihood that the agent intends to make the unmapped U-turn at the unmapped U-turn region from the candidate lane segment to the target lane segment.

14. The system of claim 9, the operations further comprise:
for each selected unmapped U-turn region,
providing features of the selected unmapped U-turn region as input to a motion planning subsystem; and
generating, by the motion planning subsystem, the data specifying the candidate future trajectory in which the agent makes the unmapped U-turn at the selected unmapped U-turn region.

15. The system of claim 9, the operations further comprise:
providing the data specifying the candidate future trajectory as input to a behavior prediction subsystem; and
generating, by the behavior prediction subsystem, data specifying a prediction of a future behavior of the agent.

16. The system of claim 9, wherein the features of the agent comprise one or more of the following: historical trajectory, heading direction, status of one or more turn lights, and speed of the agent.

17. One or more non-transitory computer-readable storage media storing instructions that when executed by one or more computers cause the one or more computers to perform operations comprising:
obtaining features of an agent travelling on a roadway;
identifying one or more unmapped U-turn regions in a vicinity of the agent on the roadway based on a respective first score for each unmapped U-turn region, wherein:
each unmapped U-turn region comprises a candidate lane segment in a road graph of the region of the roadway,
the candidate lane segment corresponds to one or more target lane segments in the road graph on an opposite side of the roadway relative to the candidate lane segment, and
the respective first score for each unmapped U-turn region represents a likelihood that agents will make a U-turn from the candidate lane segment into one of the one or more target lane segments that corresponds to the candidate lane segment;
generating, for each of the unmapped U-turn regions and from at least the features of the agent, a respective likelihood score that represents a likelihood that the agent intends to make an unmapped U-turn at the unmapped U-turn region;
selecting, based on the respective likelihood scores, one or more of the unmapped U-turn regions;
for each selected unmapped U-turn region, providing data specifying a candidate future trajectory in which the agent makes the unmapped U-turn at the selected unmapped U-turn region as a possible future trajectory for the agent; and
controlling an autonomous vehicle based on the data specifying the candidate future trajectory of the agent.

18. The non-transitory computer-readable storage media of claim 17, the operations further comprise:
obtaining data specifying a road graph of a region of the roadway;
identifying candidate lane segments in the region of the roadway;
for each candidate lane segment, identifying the one or more target lane segments on the opposite side of the roadway relative to the candidate lane segment; and
for each candidate lane segment and for each target lane segment:
processing features of the candidate lane segment and features of the target lane segment using a first machine learning model that has been trained to process the features to generate the first score.

19. The non-transitory computer-readable storage media of claim 18, wherein the operations further comprise generating a modified road graph of the region of the roadway, wherein the modified road graph comprises the one or more unmapped U-turn regions determined based on one or more respective first scores; and
wherein identifying the one or more unmapped U-turn regions in the vicinity of the agent on the roadway comprises: accessing the modified road graph of the region to identify the one or more unmapped U-turn regions.

20. The non-transitory computer-readable storage media of claim 18, the operations further comprise:
obtaining a plurality of training examples, each training example comprising: (1) features of an example candidate lane segment and features of an example target lane segment, and (2) a label indicating whether the example candidate lane segment is an unmapped U-turn region; and
training the first machine learning model using the training examples.

* * * * *